United States Patent
Coniff et al.

(10) Patent No.: US 12,367,726 B2
(45) Date of Patent: *Jul. 22, 2025

(54) BUILDING ACCESS USING A MOBILE DEVICE

(71) Applicant: Honeywell International Inc., Charlotte, NC (US)

(72) Inventors: Michael Coniff, Louisville, KY (US); Krishna Murthy, Bangalore (IN); Sreedhar Raman, Bangalore (IN); Karthik Harpanhalli, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/674,464

(22) Filed: May 24, 2024

(65) Prior Publication Data

US 2024/0312278 A1 Sep. 19, 2024

Related U.S. Application Data

(63) Continuation of application No. 18/353,700, filed on Jul. 17, 2023, now Pat. No. 12,027,007, which is a
(Continued)

(51) Int. Cl.
*G07C 9/28* (2020.01)
*G06F 21/32* (2013.01)
(Continued)

(52) U.S. Cl.
CPC ................. *G07C 9/28* (2020.01); *G07C 9/27* (2020.01); *H04W 4/029* (2018.02)

(58) Field of Classification Search
CPC ...................................................... G07C 9/28
See application file for complete search history.

(56) References Cited

U.S. PATENT DOCUMENTS

| 4,672,654 A | 6/1987 | Vanacore |
| 5,640,139 A | 6/1997 | Egeberg |

(Continued)

FOREIGN PATENT DOCUMENTS

| AT | 13608 U1 | 4/2014 |
| AU | 2014236999 A1 | 10/2015 |

(Continued)

OTHER PUBLICATIONS

HID Global, HID Mobile Access Solution Overview, PLT-02078, Rev. A.1, 18 Pages, Mar. 2015.

(Continued)

*Primary Examiner* — Joseph H Feild
*Assistant Examiner* — Pameshanand Mahase
(74) *Attorney, Agent, or Firm* — Seager, Tufte & Wickhem, LLP

(57) ABSTRACT

Methods and systems for unlocking an access point of a facility with a mobile device. Permissions and locations of access points of the facility that are accessible to a user of a particular mobile device may be downloaded and a location of the particular mobile device determined. The mobile device may identify one or more access points of the facility that are accessible by the user of the mobile device based on the location of the mobile device and the downloaded permissions and locations of the access points. The method may include displaying on the mobile device a notification of the access points that are identified by the mobile device, receiving a selection of one of the displayed access points from the user via a user interface of the mobile device, sending a command from the mobile device to unlock the selected access point, and unlocking the selected access point.

30 Claims, 12 Drawing Sheets

Related U.S. Application Data continuation of application No. 17/188,695, filed on Mar. 1, 2021, now Pat. No. 11,749,045.

(51) Int. Cl.
*G07C 9/27* (2020.01)
*G07C 9/37* (2020.01)
*H04W 4/021* (2018.01)
*H04W 4/029* (2018.01)
*H04W 4/33* (2018.01)

(56) References Cited

U.S. PATENT DOCUMENTS

| | | |
|---|---|---|
| 6,384,709 B2 | 5/2002 | Mellen et al. |
| 6,989,732 B2 | 1/2006 | Fisher |
| 7,009,489 B2 | 3/2006 | Fisher |
| 7,012,503 B2 | 3/2006 | Nielsen |
| 7,022,104 B2 | 4/2006 | Konstantino |
| 7,734,068 B2 | 6/2010 | Fisher |
| 7,903,846 B2 | 3/2011 | Fisher |
| 7,969,302 B2 | 6/2011 | Srinivasa et al. |
| 8,164,419 B2 | 4/2012 | Fisher |
| 8,232,879 B2 | 7/2012 | Davis |
| 8,427,320 B2 | 4/2013 | Davis |
| 8,451,088 B2 | 5/2013 | Fisher |
| 8,529,596 B2 | 9/2013 | Grandfield et al. |
| 8,560,839 B2 | 10/2013 | Barham et al. |
| 8,593,249 B2 | 11/2013 | Bliding et al. |
| 8,643,475 B1 | 2/2014 | Kohno et al. |
| 8,693,249 B2 | 4/2014 | Yano et al. |
| 8,768,306 B1 | 7/2014 | Ben Ayed |
| 8,792,936 B2 | 7/2014 | Rajendran et al. |
| 8,793,776 B1 | 7/2014 | Jackson |
| 8,839,361 B2 | 9/2014 | R |
| 8,912,884 B2 | 12/2014 | Fisher |
| 8,943,187 B1 | 1/2015 | Saylor |
| 9,053,629 B2 | 6/2015 | Fisher et al. |
| 9,058,702 B2 | 6/2015 | Chao et al. |
| 9,076,273 B2 | 7/2015 | Smith et al. |
| 9,098,688 B1 | 8/2015 | Jackson |
| 9,118,656 B2 | 8/2015 | Ting et al. |
| 9,292,985 B2 | 3/2016 | Ahearn et al. |
| 9,305,298 B2 | 4/2016 | Wilson |
| 9,322,194 B2 | 4/2016 | Cheng et al. |
| 9,322,201 B1 | 4/2016 | Cheng et al. |
| 9,367,676 B2 | 6/2016 | Wilson |
| 9,382,739 B1 | 7/2016 | Johnson et al. |
| 9,396,320 B2 | 7/2016 | Lindemann |
| 9,444,805 B1 | 9/2016 | Saylor et al. |
| 9,470,017 B1 | 10/2016 | Cheng et al. |
| 9,470,018 B1 | 10/2016 | Cheng et al. |
| 9,472,034 B2 | 10/2016 | Ahearn et al. |
| 9,508,206 B2 | 11/2016 | Ahearn et al. |
| 9,514,469 B2 | 12/2016 | Fuchs et al. |
| 9,530,295 B2 | 12/2016 | Johnson |
| 9,589,403 B2 | 3/2017 | Lingan et al. |
| 9,600,949 B2 | 3/2017 | Conrad et al. |
| 9,704,315 B2 | 7/2017 | Fisher et al. |
| 9,713,002 B2 | 7/2017 | Roy et al. |
| 9,730,001 B2 | 8/2017 | George |
| RE46,539 E | 9/2017 | Fisher |
| 9,767,632 B2 | 9/2017 | Johnson |
| 9,830,760 B2 | 11/2017 | Fisher |
| 9,887,983 B2 | 2/2018 | Lindemann et al. |
| 10,068,399 B2 | 9/2018 | Fisher et al. |
| 10,096,182 B2 | 10/2018 | Prasad et al. |
| 10,176,310 B2 | 1/2019 | Baghdasaryan |
| 10,182,309 B2 | 1/2019 | Mahasenan et al. |
| 10,186,098 B2 | 1/2019 | Lingan et al. |
| 10,186,099 B2 | 1/2019 | Ahearn et al. |
| 10,198,884 B2 | 2/2019 | Johnson |
| 10,268,811 B2 | 4/2019 | Baghdasaryan |
| 10,270,748 B2 | 4/2019 | Briceno et al. |
| 10,304,273 B2 | 5/2019 | Johnson et al. |
| 10,366,218 B2 | 7/2019 | Blanke |
| 10,395,452 B2 | 8/2019 | Morrison et al. |
| 10,878,650 B1 | 12/2020 | Meruva et al. |
| 11,348,391 B2 | 5/2022 | Fisher et al. |
| 11,348,396 B2 | 5/2022 | Meruva et al. |
| 11,363,459 B2 | 6/2022 | Pazhyannur et al. |
| 2003/0179073 A1 | 9/2003 | Ghazarian |
| 2004/0025039 A1 | 2/2004 | Kuenzi et al. |
| 2005/0071673 A1 | 3/2005 | Saito |
| 2005/0242957 A1 | 11/2005 | Lindsay et al. |
| 2007/0025314 A1 | 2/2007 | Gerstenkorn |
| 2007/0186106 A1 | 8/2007 | Ting et al. |
| 2007/0205861 A1 | 9/2007 | Nair et al. |
| 2009/0249433 A1 | 10/2009 | Misra et al. |
| 2010/0052931 A1 | 3/2010 | Kolpasky et al. |
| 2010/0102993 A1 | 4/2010 | Johnson |
| 2010/0201536 A1 | 8/2010 | Robertson et al. |
| 2010/0297941 A1 | 11/2010 | Doan et al. |
| 2011/0001603 A1 | 1/2011 | Willis |
| 2011/0291798 A1 | 12/2011 | Schibuk |
| 2012/0092127 A1 | 4/2012 | Ganapathi et al. |
| 2012/0154115 A1 | 6/2012 | Herrala |
| 2012/0159156 A1 | 6/2012 | Barham et al. |
| 2012/0169461 A1 | 7/2012 | Dubois, Jr. |
| 2012/0213362 A1 | 8/2012 | Bliding et al. |
| 2012/0230489 A1 | 9/2012 | Cho |
| 2012/0234058 A1 | 9/2012 | Neil et al. |
| 2012/0280783 A1 | 11/2012 | Gerhardt et al. |
| 2012/0280790 A1 | 11/2012 | Gerhardt et al. |
| 2012/0311642 A1 | 12/2012 | Ginn et al. |
| 2013/0021145 A1 | 1/2013 | Boudy |
| 2013/0176107 A1 | 7/2013 | Dumas et al. |
| 2013/0212661 A1 | 8/2013 | Neafsey et al. |
| 2013/0214898 A1 | 8/2013 | Pineau et al. |
| 2013/0221094 A1 | 8/2013 | Smith et al. |
| 2013/0247117 A1* | 9/2013 | Yamada ............ H04B 5/72 340/12.5 |
| 2013/0257589 A1 | 10/2013 | Mohiuddin et al. |
| 2013/0268998 A1 | 10/2013 | Ko et al. |
| 2013/0311373 A1 | 11/2013 | Han et al. |
| 2013/0314210 A1 | 11/2013 | Schoner et al. |
| 2013/0332367 A1 | 12/2013 | Quigley et al. |
| 2014/0002236 A1 | 1/2014 | Pineau et al. |
| 2014/0028348 A1 | 1/2014 | Andreev et al. |
| 2014/0049361 A1 | 2/2014 | Ahearn et al. |
| 2014/0051407 A1 | 2/2014 | Ahearn et al. |
| 2014/0084059 A1 | 3/2014 | Sierchio et al. |
| 2014/0089178 A1 | 3/2014 | Lee et al. |
| 2014/0109175 A1 | 4/2014 | Barton et al. |
| 2014/0159660 A1 | 6/2014 | Klose et al. |
| 2014/0189880 A1 | 7/2014 | Funk et al. |
| 2014/0219431 A1 | 8/2014 | Wagner et al. |
| 2014/0240087 A1 | 8/2014 | Liu et al. |
| 2014/0267739 A1 | 9/2014 | Ibsies et al. |
| 2014/0277935 A1 | 9/2014 | Daman et al. |
| 2014/0289116 A1 | 9/2014 | Polivanyi |
| 2014/0289117 A1 | 9/2014 | Baghdasaryan |
| 2014/0289790 A1 | 9/2014 | Wilson |
| 2014/0289820 A1 | 9/2014 | Lindemann et al. |
| 2014/0289833 A1 | 9/2014 | Briceno et al. |
| 2014/0342667 A1 | 11/2014 | Aarnio |
| 2014/0375421 A1 | 12/2014 | Morrison et al. |
| 2014/0380444 A1 | 12/2014 | Kelley |
| 2015/0004937 A1 | 1/2015 | Kremen et al. |
| 2015/0035987 A1 | 2/2015 | Fernandez |
| 2015/0048927 A1 | 2/2015 | Simmons |
| 2015/0194000 A1* | 7/2015 | Schoenfelder ..... G07C 9/00309 340/5.61 |
| 2015/0227923 A1 | 8/2015 | Kutsch et al. |
| 2015/0227969 A1 | 8/2015 | Hanly |
| 2015/0256973 A1 | 9/2015 | Raounak |
| 2015/0279132 A1 | 10/2015 | Perotti |
| 2016/0035159 A1 | 2/2016 | Ganapathy Achari et al. |
| 2016/0049025 A1 | 2/2016 | Johnson |
| 2016/0055692 A1 | 2/2016 | Trani |
| 2016/0055698 A1 | 2/2016 | Gudmundsson et al. |
| 2016/0080390 A1 | 3/2016 | Kalb et al. |
| 2016/0155281 A1 | 6/2016 | O'Toole et al. |
| 2016/0189454 A1 | 6/2016 | Johnson et al. |
| 2016/0319571 A1 | 11/2016 | Johnson |

(56) References Cited

U.S. PATENT DOCUMENTS

| | | | |
|---|---|---|---|
| 2016/0335819 | A1 | 11/2016 | Lingan et al. |
| 2016/0337508 | A1 | 11/2016 | Roy et al. |
| 2017/0018130 | A1* | 1/2017 | Robinson ............ G07C 9/28 |
| 2017/0076523 | A1 | 3/2017 | Rumble et al. |
| 2017/0127372 | A1 | 5/2017 | Patel et al. |
| 2017/0270732 | A1 | 9/2017 | Troesch et al. |
| 2017/0280322 | A1 | 9/2017 | Roy et al. |
| 2017/0289753 | A1 | 10/2017 | Mahasenan et al. |
| 2018/0047233 | A1 | 2/2018 | Fisher |
| 2018/0068503 | A1 | 3/2018 | Prasad et al. |
| 2018/0068507 | A1 | 3/2018 | Prasad et al. |
| 2018/0144568 | A1 | 5/2018 | Lingan et al. |
| 2018/0234410 | A1 | 8/2018 | Lindemann et al. |
| 2018/0247038 | A1 | 8/2018 | Lindemann |
| 2018/0268675 | A1 | 9/2018 | Johnson et al. |
| 2019/0019364 | A9 | 1/2019 | Cheng et al. |
| 2019/0104133 | A1 | 4/2019 | Markel et al. |
| 2019/0130686 | A1 | 5/2019 | Cheng et al. |
| 2019/0130687 | A1 | 5/2019 | Johnson |
| 2019/0253404 | A1 | 8/2019 | Briceno et al. |
| 2019/0371096 | A1 | 12/2019 | Fisher |
| 2020/0098216 | A1 | 3/2020 | Kuster et al. |
| 2020/0351661 | A1* | 11/2020 | Kuenzi ............ G06Q 30/0267 |
| 2020/0394856 | A1 | 12/2020 | Meruva et al. |
| 2022/0270424 | A1 | 8/2022 | Meruva et al. |
| 2022/0277605 | A1 | 9/2022 | Coniff et al. |
| 2022/0384949 | A1 | 12/2022 | Pirch |
| 2023/0032659 | A1 | 2/2023 | Roy et al. |

FOREIGN PATENT DOCUMENTS

| | | | |
|---|---|---|---|
| CA | 2640261 | A1 | 8/2007 |
| CA | 2654838 | A1 | 8/2009 |
| CA | 2840665 | A1 | 8/2014 |
| CA | 2905009 | A1 | 9/2014 |
| CH | 699096 | A2 | 1/2010 |
| CN | 102609662 | B | 7/2012 |
| CN | 104144497 | A | 11/2014 |
| CN | 104200555 | A | 12/2014 |
| CN | 206557866 | U | 10/2017 |
| CN | 103685218 | B | 9/2018 |
| CN | 103971039 | B | 3/2020 |
| CN | 105229596 | B | 4/2020 |
| CN | 112211502 | A | 1/2021 |
| DE | 102014106364 | A1 | 11/2014 |
| DE | 102014119003 | A1 | 6/2016 |
| EP | 265270 | A2 | 4/1988 |
| EP | 1982288 | A2 | 10/2008 |
| EP | 2085934 | A1 | 8/2009 |
| EP | 2106106 | A1 | 9/2009 |
| EP | 2192560 | A1 | 6/2010 |
| EP | 2701124 | A1 | 2/2014 |
| EP | 2709334 | A2 | 3/2014 |
| EP | 2763106 | A2 | 8/2014 |
| EP | 2976706 | A2 | 1/2016 |
| EP | 3048587 | A1 | 7/2016 |
| ES | 2700361 | T3 | 2/2019 |
| IN | 2014CH00324 | A | 4/2015 |
| JP | 2012237158 | A | 12/2012 |
| JP | 2014503909 | A | 2/2014 |
| JP | 6433978 | B2 | 12/2018 |
| JP | 2019061688 | A | 4/2019 |
| KR | 20060011267 | A | 2/2006 |
| KR | 101889577 | B1 | 8/2018 |
| TW | I513266 | B | 12/2015 |
| WO | 2006136662 | A1 | 12/2006 |
| WO | 2007089503 | A2 | 8/2007 |
| WO | 2010003898 | A1 | 1/2010 |
| WO | 201287853 | A2 | 6/2012 |
| WO | 2014031399 | A1 | 2/2014 |
| WO | 2014044832 | A1 | 3/2014 |
| WO | 2014151692 | A2 | 9/2014 |
| WO | 2014153462 | A2 | 9/2014 |
| WO | 2016019064 | A1 | 2/2016 |

OTHER PUBLICATIONS

The Bluetooth® REALTOR® Lockbox Getting Started Guide, Sentrilock, 17 pages, 2015. Last Update to this Topic: Aug. 13, 2015.

Sentrilock Bluetooth® REALTOR® Lockbox SentriSmart Mobile App, 1 page, 2015.

SentriSmart™ User Guide for Apple Products, 7 pages, 2015. Last Update Feb. 26, 2016.

SentriSmart™ Flyer, 2 pages, 2015.

SentriSmart™ Flyer, 2 pages, 2014.

Smart Lock: Unlocking a Smarter more Secure Home Asmag.com Ranking, 6 pages. Accessed Sep. 6, 2024.

Mobile Credential End-User Flyer, 3x Logic, Westminster, CO, 2 pages, 2018.

Cappos et al; "BlurSense: Dynamic Fine-Grained Access Control for Smart Phone Privacy," 2014 IEEE Sensors Applications Symposium (SAS), 4 pages, 2014.

Kupper et al; "TraX: a Device-Centric Middleware Framework for Location Based Services," IEEE Communications Magazine, pp. 114-120, Sep. 2006.

Liu et al; "Double-Windows-Based Motion Recognition in Multi-Floor Buildings Assisted by a Built-in Barometer," Sensors, 2018, 18, 1061, pp. 1-23, Mar. 2018.

Location Based Tracker-Future Lab-ASSA ABLOY-Studying Security Trends. 2 pages, https: //futurelab.assaabloy.com/en/location-based-tracker/ accessed Mar. 1, 2021.

Shuster et al; "Situational Access Control in the Internet of Things," In 2018 SIGSAC Conference on Computer Communication Security (CCS' 18), Toronto, Ontario, Canada, 18 pages, Oct. 15-19, 2018.

Smart Keys, Locks and Door Openers as Part of Intelligent Access Control Systems, Conrad Connect, 2021. https://conradconnect.com/en/blog/smart-keys-locks-and-door-openers-part-intelligent-access-control-systems 16 pages, accessed Mar. 1, 2021.

Tarameshloo et al; "Access Control Models for Geo-Social Computing Systems," SACMAT' 14, London, Ontario, Canada, 12 pages, Jun. 25-27, 2014.

Zhang et al; "Location-Based Authentication and Authorization using Smart Phones," 2012 IEEE 11th International Conference on Trust, Security and Privacy in Computing and Communications, 8 pages, 2012.

Extended European Search Report, European Patent Office, EP Application No. 22156072.5, dated Jul. 21, 2022 (10 pages).

https://www.merriam-webster.com/dictionary/track 2 pages, accessed Apr. 7, 2017.

https://youtube/D1L3088GKew, Lockitron—Keyless Entry Using Your Phone, Lockitron, 3 pages, Oct. 2, 2012. Accessed Mar. 19, 2018.

International Search Report for Corresponding Application No. EP14173062 dated Dec. 5, 2014.

MicroStrategy, "Secure Business Intelligence on Apple® Mobile Devices," Microstrategy Incorporated, 20 pages, COLL-09670511, 2011.

Khan et al., "Location Awareness in 5G Networks using RSS Measurements for Public Safety Applications," IEEE Access, vol. 5, pp. 21753-21762, 2017.

Qiu, "Study on Security and Privacy in 5G-Enabled Applications," Wireless Communications and Mobile Computing, vol. 2020, 15 pages, 2020.

Usher, "Safe and Secure Mobile Identity Network," Micro-Strategy Incorporated, 2 pages, COLL-1085 1012, 2013.

Wikipedia, International Mobile Equipment Identity, 7 pages, Accessed Aug. 24, 2023.

Fave et al., "Game-theoretic Security Patrolling with Dynamic Execution Uncertainty and a Case Study on a Real Transit System," Journal of Artificial Intelligence Research vol. 50, pp. 321-367, Jun. 2014.

"Logosoft brings lone worker supervision into the Android era," http://www.securitynewsdesk.com/lo go soft-brings-lone-worke••supervision-android-era/, 7 pages, May 29, 2014.

(56) References Cited

OTHER PUBLICATIONS

Sookman, "Smartphones are Key to the Future of Security," https://www.guardly.com/blog /2015 /0 2/04/smartphones-are-key-to-the•future-of-security/index.html, 5 pages, Feb. 4, 2015.

Bobescu et al., "Mobile indoor positioning using wi-fi localization," Review of the Air Force Academy, No. 1 (28), 4 pages, 2015.

Bhargava et al., "Physical Authentication through Localization in Wireless Local Area Networks," Global Telecommunications Co••ference, GLOBECOM '05 IEEE, 5 pages Jan. 23, 2006.

"Passive Entry Door System with Proximity Sensor," http://www.atmel.corn/Images/ Atmel-425 82-Passive-Entry-Door-System-with•Proximity-Sensor_Application%20N ote _AT 12649. pdf, 22 pages, Nov. 2015.

Bellido-Outeirno, "Universal Bluetooth Access Control and Sec••rity System," International Journal on Advances in Security, vol. 4 No. 3 and 4, 10 pages, 2011.

"Mobile Access Control: the Ultimate Guide," KISI, 10 pages, accessed Jun. 17, 2019.

Woolaston, "The end of the house key? Mobile app lets you open your front door using your PHONE (and you don't even need to take it out of your pocket)", http.//www.dailymail.co.uk/sciencetech/article-2384817/Kwikset-Kevo-mobile-app-lets-open-door-using-PHONE.html; Aug. 5, 3 pages, 2013.

"Sesame Smart Lock", http://www.candyhouse.co/. 8 pages, Accessed Oct. 21, 2015.

Usher Mobile Identity Platform. MicroStrategy. 24 pages. https://www.microstrategy.com/Strategy/media/downloads/products/usher_overview-presentation.pdfpresentation.pdf. Accessed Feb. 5, 2015.

Sentrilock Sentrikey® Iphone Mobile App Guide, 2024. https://www.sentrilock.com/sentrikey-real-estate-ios-mobile-app/.

Sentrilock, Let's Unlock the Possibilities, Electronic Lockboxes Sales Brochure, 2024. https://www.sentrilock.com/.

Sentrilock Sues Competitor, Alleging Patent Infringement, National Association of Realtors® 3 pages, Feb. 16, 2022. Accessed Mar. 14, 2024.

Sentrilock, Your Secure Lockbox Solution, The Secure, Safe and Easy-to-Use Lockbox, 1 page, May 2019.

"Realtor Instructions for Opening Realcomp-Issued SentriLock Bluetooth Lockboxes", RealComp, Updated Sep. 8, 2020, flyer found online http://bit.ly/how-to-show (3 pages).

"SentriKey Real Estate Mobile App for Android", User Guide, SentriKey Real Estate, May 24, 2019 (32 pages).

\* cited by examiner

FIG. 7

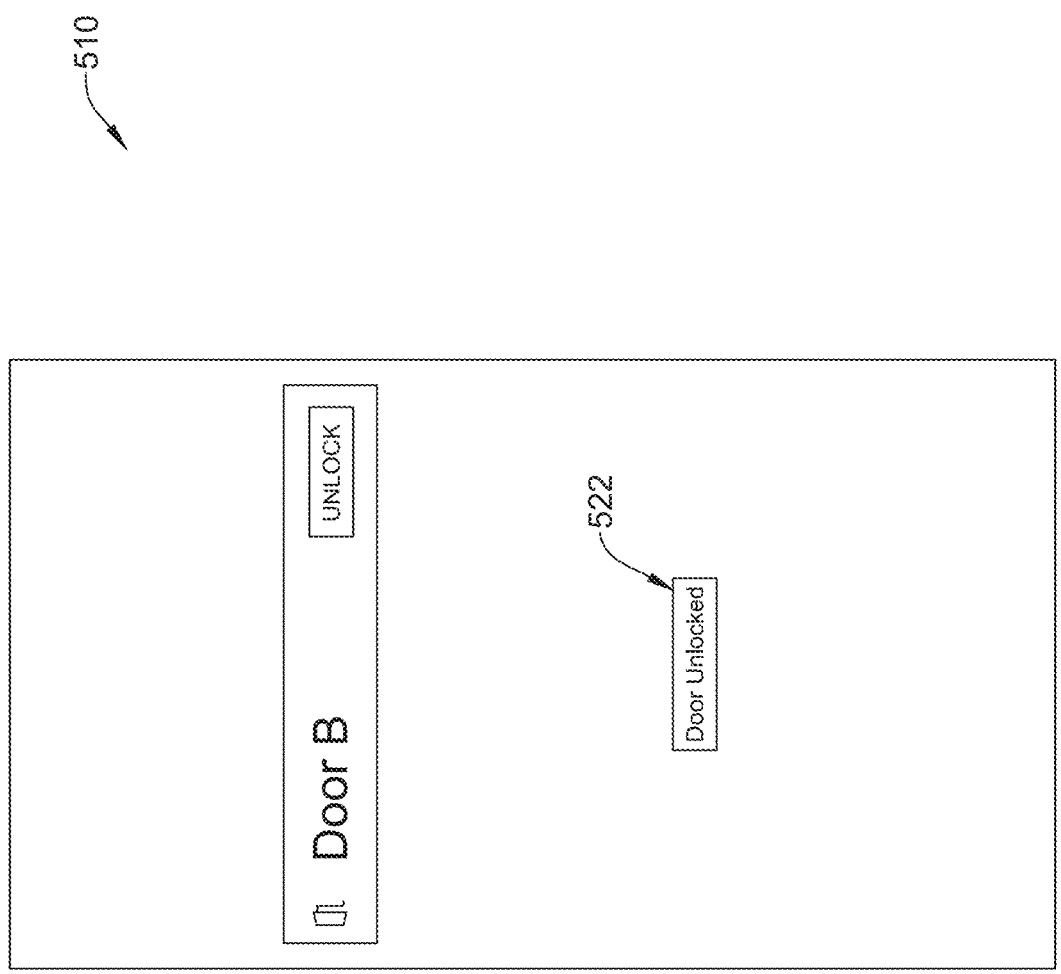

BUILDING ACCESS USING A MOBILE DEVICE

This is a continuation of co-pending U.S. patent application Ser. No. 18/353,700, filed Jul. 17, 2023, and entitled "BUILDING ACCESS USING A MOBILE DEVICE", which is a continuation of co-pending U.S. patent application Ser. No. 17/188,695, filed Mar. 1, 2021, and entitled "BUILDING ACCESS USING A MOBILE DEVICE", now U.S. Pat. No. 11,749,045, both of which are incorporated herein by reference.

TECHNICAL FIELD

The disclosure is directed to providing building access through a mobile device.

BACKGROUND

Physical access control systems are designed to provide access to buildings and/or specific areas of a building for individuals who are authorized to access such areas and to deny access to buildings and/or specific areas of the building to individuals who are not authorized to access such areas. For example, certain individuals may be authorized to access a secure area of a building, whereas other individuals may not be allowed to access the secure area. In another example, certain individuals may be authorized to access a first building but not a second building, whereas other individuals may not be allowed to access either building. In some cases, access may be granted only during certain times.

Current approaches to physical access control systems often rely on users (e.g., employees) carrying physical access cards (e.g., physical badge) to gain entry to areas of a building. For example, a user can swipe a physical access card in an access card reader at a security door to gain entry to an area of a building. However, issuing and managing physical access card can be time consuming, cumbersome and error prone. What would be desirable is a system which allows a user's mobile device to act as an access credential with current building access systems.

SUMMARY

This disclosure is directed to providing and/or managing access control, and more particularly to methods and systems for using a user's mobile device as an access credential to gain access to one or more authorized areas.

An example method for managing access to a facility may include selecting a commissioning mode in an application running on a mobile device. When in the commissioning mode, displaying via a user interface of the mobile device a list of access points associated with the facility, receiving a selection of an access point from the list of access points via the user interface of the mobile device, physically placing the mobile device adjacent to the selected access point, capturing and storing a current location of the mobile device and thus a location of the selected access point, associating the captured location of the mobile device with the selected access point, repeating the receiving, placing, capturing and associating steps for each of two or more access points in the list of access points, and uploading the associations between the captured locations of the mobile device and each of the two or more access points. These associations may be used in controlling access to the facility.

In some cases, the method may include subsequently receiving a registration request from a user via a user interface of a user mobile device, associating the user and the user mobile device with one or more access points from the list of access points based on one or more user permissions, displaying on the user mobile device at least some of the one or more access points that the user is associated based on one or more user permissions, selecting via the user interface of the user mobile device one of the displayed access points to unlock, and sending a request to unlock the selected access point.

In some cases, the method may include determining a current location of the user mobile device and determining a distance between the current location of the user mobile device and the location captured in the commissioning mode and associated with each of the two or more access points. The access points that are displayed on the user interface of the user mobile device may be those that are within a threshold distance of the current location of the user mobile device.

In another example, a method for unlocking an access point of a facility may include downloading permissions and locations of access points of the facility that are accessible to a user of a particular mobile device and receiving a location of the particular mobile device. The particular mobile device may determine one or more access points of the facility based on the location of the particular mobile device and the downloaded permissions and locations of the access points of the facility. The method may further include displaying on the particular mobile device a notification of the one or more access points that are determined by the particular mobile device, receiving a selection of one of the displayed access points from the user via a user interface of the particular mobile device, sending a command from the particular mobile device to unlock the selected access point, and unlocking the selected access point. Prior to unlocking the selected access point, the method may further include verifying one or more access credential of the user.

In some cases, the notification of one or more access points may identify those access points that are within a predetermined distance from the particular mobile device and may not include those access points that are not within the predetermined distance from the particular mobile device. Alternatively, the notification of one or more access points may include all access points in the facility that are accessible by the user.

In another example, a non-transitory computer-readable medium having instructions stored thereon that when executed by a mobile device may be configured to receive a user credentials from a user via a user interface of the mobile device to verify an identity of the user, verify the received user credentials of the user, receive a current location of the mobile device from a location service of the mobile device, determine a distance between the current location of the mobile device and each of one or more access points of a facility, and display on the user interface of the mobile device one or more of the access points of the facility. The one or more access points that are displayed may be those that are accessible to the user based on one or more access point permissions associated with the user, and in some cases are within a threshold distance from the current location of the mobile device. The user interface of the mobile device may receive a selection of one of the displayed access points to unlock, and the mobile device may send a request to unlock the selected access point to an access control system of the building.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which:

FIG. 7 is an illustrative setup portal for an access control system for use by an administrator;

FIGS. 9-12 are illustrative screen captures of an application running on a user's mobile device to access a building.

Figure 1:
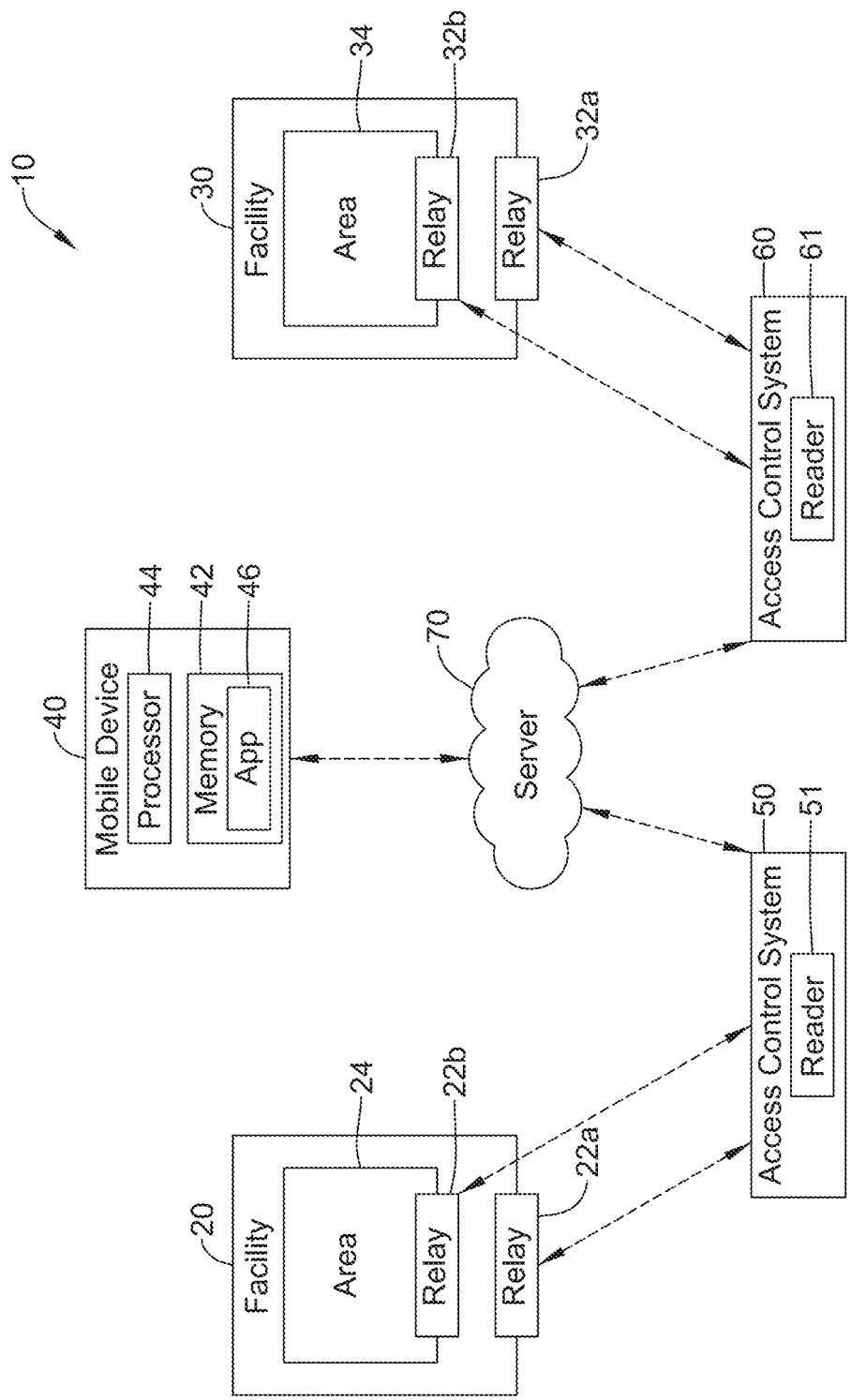
FIG. 1 is a schematic diagram of an illustrative access control system for accessing multiple buildings via mobile device.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (i.e., having the same function or result). In many instances, the term "about" may be indicative as including numbers that are rounded to the nearest significant figure The recitation of numerical ranges by endpoints includes all numbers within that range (e.g., 1 to 5 includes 1, 1.5, 2, 2.75, 3, 3.80, 4, and 5).

Although some suitable dimensions ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following description should be read with reference to the drawings in which similar elements in different drawings are numbered the same. The drawings show by way of illustration how one or more embodiments of the disclosure may be practiced. The illustrative embodiments depicted are intended only as exemplary. Selected features of any illustrative embodiment may be incorporated into an additional embodiment unless clearly stated to the contrary.

User interaction with a door access control system can be streamlined using capabilities offered by mobile devices. For example, in some embodiments, global positioning system (GPS), WiFi, Bluetooth, and/or other location functionalities provided by a mobile device may allow the automatic determination of user location (e.g., without user input). Thus, in some cases, rather than physically presenting a card (or other device) for access to an area or facility, the user may simply move within a particular distance of a door and be automatically presented with an option to unlock the door. Rather than using "card readers", embodiments of the present disclosure allow a user's mobile device to perform the function of an access card. It is contemplated that the embodiments of the present disclosure may be utilized with a variety of access systems. In some cases, embodiments of the present disclosure may be used with or in place of systems with door access card readers (those with and/or without Bluetooth® capabilities). Alternatively, or additionally, embodiments of the present disclosure may be used with systems that only include an actuatable lock mechanism (e.g., no card readers present).

The present disclosure is generally directed towards methods and systems for allowing secure access to one or more access points using a mobile device. It is contemplated that the system may allow a user to access two different buildings having two different access control providers using the same mobile device. In some cases, the buildings may belong to the same entity (e.g., company and corporation) or the buildings may belong to different entities, as may be the case for a person servicing certain building equipment that is use in many buildings. Generally, access points may be tagged with a geographic location (e.g., latitude, longitude, and/or altitude) and a door name. These access points may be selectively made available to users via the user's mobile device. Actuation of an unlock button on the mobile device may result in the unlocking of the door.

Embodiments of the present disclosure can reduce the need to issue a physical badge for every location or facility that a person (e.g., an employee, a contractor, a repair person, etc.) needs to access. Embodiments of the present disclosure can be retrofit to existing access control systems with and/or without smart reader systems without having to add additional hardware. Further, embodiments of the present disclosure may streamline or facilitate access requests for access to facilities and/or locations.

FIG. 1 is a schematic diagram of an illustrative access control system 10 for multiple buildings 20, 30 via a user's mobile device 40. A facility or building, as used herein, can refer to one or more buildings, businesses, homes, plants, hospitals, refineries, etc. Facilities can include indoor and/or outdoor areas. The illustrative system 10 may include a first facility 20, a second facility 30, a mobile device 40, a first door access control system (ACS) 50 optionally including at least one card reader 51 and in communication with one or more relays 22a, 22b (collectively 22), and a second door access control system (ACS) 60 optionally including at least one card reader 61 and in communication with one or more relays 32a, 32b (collectively, 32). While the illustrative system 10 includes a first and a second facility 20, 30, it should be understood that the system 10 may be applied to fewer than two facilities or more than two facilities, such as, but not limited to three or more, 10 or more, 20 or more, 50 or more, etc. Similarly, while the illustrative system 10 is illustrated as having a first and a second access system 50, 60, it should be understood that the system 10 may be applied to less or more than two or more than two access systems. In some cases, the number of access systems may correspond to the number of facilities in the system 10. While the access control systems 50, 60 are described as door access control systems, the access control systems 50, 60 may control other means of entry into a building or area, including, but not limited to, turnstiles or baffle gates, revolving doors, gates, etc.

Though in the example illustrated in FIG. 1 the first ACS 50 is shown external to the first facility 20 (e.g., remote with respect to the first facility 20) and the second ACS 60 is shown external to the second facility 30 (e.g., remote with respect to the second facility 30), embodiments of the present disclosure are not so limited. In some cases, the first ACS 50 and/or the second ACS 60 are internal to the first facility 20 (e.g., local with respect to the first facility 20) and/or the second facility 30 (e.g., local with respect to the second facility 30), respectively.

The mobile device 40 may be a client device carried or worn by a user. It should be understood that more than one mobile device 40 may be utilized with the access control system 10. For example, each user may have their own particular or unique mobile device 40. The mobile device 40 may be a phone (e.g., smartphone), personal digital assistant (PDA), tablet, and/or wearable device (e.g., wristband, watch, necklace, etc.). These are just examples. The mobile device 40 may include a user interface including a display and a means for receiving user input (e.g., touch screens, buttons, keyboards, etc.). The mobile device 40 may further have locations services. For example, the mobile device 40 may use a built-in global positioning system (GPS) in combination with GPS satellites to pinpoint a location of the mobile device 40. In other cases, the location of the mobile device 40 may be estimated based on a direction of the signal and a distance from one or more cell towers. The mobile device 40 can include one or more software applications (e.g., apps) 46 stored within a memory 42 of the mobile device 40 that can define and/or control communications between the mobile device, the first ACS 50, the second ACS 60, and/or other devices. In some cases, the mobile device 40 may communicate with the first ACS 50, the second ACS 60, and/or other devices via a remote or cloud server 70, as will be described in more detail herein. Apps 46 may be received by the mobile device 40 from the first ACS 50 and/or the second ACS 60, for instance, although this is not required. In other embodiments, the application 46 may be downloaded from an app store, such as, but not limited to ITUNES® or GOOGLE PLAY®, or an access control service provider's web site.

In some embodiments, the application 46 may be an integrated security platform which may include access control and security system components. Users may manage the access control system and/or the security system from the app 46 and/or via a web browser, as desired. In some cases, the app 46 may present different features based upon a user's login credentials. It is contemplated that the amount and type of information that is visible to a user of the app 46 may be based, at least in part, on the permissions assigned to the particular user. For example, a member of a security team may have access to the security system components while a routine building user may not. Further, some users may be capable of accessing a commissioning mode while other users may not. In some cases, different applications 46 may be available for regular employees and visitors.

Apps 46 may be launched by a user and/or responsive to some other condition (e.g., the interaction between the mobile device 40 and a device within the door access system, such as a controller or relay, or when the location services of the mobile device detects the location of the mobile device is near a facility in which the user is registered to access). In some embodiments, apps 46 can be executing as background apps. As used herein, at least one of the apps 46 includes a digital identifier. In some cases, the digital identifier may be a unique device identifier provided by the phone operating system (e.g., Android™ (Android is a trademark of Google LLC), iOS® (IOS is a trademark of Cisco and used under license by Apple), etc.) to uniquely identify a mobile device. In other cases, a digital identifier may include, but is not limited to a phone number and/or an International mobile equipment identity (IMEI) number. In some cases, at least one of the apps 46 may include more than one digital identifier.

In the example shown, the relays 22, 32 can be actuated by variation in conditions of one or more electric circuits. In some examples, the relays 22, 32 can be a locking device (e.g., for a door). In some examples, the relays 22, 32 can include one or more actuating mechanisms. The relays 22, 32 can be associated with one or more controlled functionalities. As used herein "controlled functionality" refers to a functionality under the control of the first ACS 50 and/or the second ACS 60. For instance, an electronic door lock may include a relay that is controlled by the first ACS 50 and/or the second ACS 60 to lock/unlock a door.

The relays 22a, 32a can be associated with an entry point (e.g., an exterior door) of the respective facility 20, 30, and/or the relays 22b, 32b can be associated with a specific area 24, 34 of the respective facility 20, 30. As referred to herein, an area can be a portion of a facility. In some embodiments, the area 24, 34 can be a room, a plurality of rooms, a wing, a building, a plurality of buildings, a campus, etc. In some embodiments, the area 24, 34 can be defined by physical boundaries (e.g., walls, doors, etc.). In some embodiments, the area 24, 34 can be defined by logical and/or geographic boundaries (e.g. geofence). The area 24, 34 can be defined by a user, by a Building Information Model (BIM) associated with the respective facility 20, 30, by the first ACS 50 and/or the second ACS 60, and/or in any other suitable way.

The first ACS 50 and/or the second ACS 60 can control (e.g., manage) access to a number of areas (e.g., the area 24, 34) and/or a number of entry points of the respective facility 20, 30. As previously discussed, the first ACS 50 and/or the second ACS 60 can be remote with respect to the facility 20, 30 and/or local with respect to the facility 20, 30. In some embodiments, the first ACS 50 and/or the second ACS 60 can be cloud-based. In some embodiments, the first ACS 50 and/or the second ACS 60 can manage access to one or more areas across a plurality of facilities. It is further contemplated that the first ACS 50 and the second ACS 60 may be configured to accept different credentials and/or may have different connectivity, although this is not required.

The mobile device 40 can communicate with (e.g., exchange data with) the first ACS 50 and/or the second ACS 60 via a wired and/or wireless connection, for instance. In some cases, the communication may occur via a cloud server 70. For example, the mobile device 40 may transmit information to the cloud server 70, the cloud server 70 may process the information and subsequently transmit a command to the appropriate ACS 50, 60. In some embodiments, the mobile device 40 can communicate using one or more communication modules (e.g., cellular, WiFi, etc.). The first ACS 50 and/or the second ACS 60 can communicate with the relays 22, 32 via a wired and/or wireless connection, for instance. Communication between various devices herein can be carried out over a wireless and/or a wired network. A wireless network, as used herein, can include WiFi, Bluetooth, Cellular or any other suitable means to wirelessly transmit and/or receive information.

The illustrative mobile device 40 includes a memory 42 and a processor 44. The processor 44 is configured to execute executable instructions stored in the memory 42 to perform various tasks. Data may also be stored in the memory 42 to be used in executing the instructions. For example, in some embodiments, the memory 42 stores instructions executable by the processor 44 to provide data in the form of a specific user identity assigned to the mobile device to the access control system. The memory 42 can be any type of non-transitory storage medium that can be accessed by the processor 44 to perform various examples of the present disclosure. For example, the memory 42 can be a non-transitory computer readable medium having computer readable instructions (e.g., computer program instructions) stored thereon that are executable by the processor 44. The execution of the computer readable instructions may result in the actuation of a relay 22, 32 which in turn allows entrance to a facility 20, 30 and/or an area 24, 34 of said facility 20, 30.

The memory 42 can be volatile or nonvolatile memory. The memory 42 can also be removable (e.g., portable) memory, or non-removable (e.g., internal) memory. For example, the memory 42 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical storage, and/or a magnetic medium such as magnetic cassettes, tapes, or disks, among other types of memory.

In addition to, or in place of, the execution of executable instructions, various functions of the present disclosure can be performed via one or more devices (e.g., one or more controllers) having logic. As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor. It is presumed that logic similarly executes instructions for purposes of the embodiments of the present disclosure.

In some cases, the memory 42 can store data in the form of a digital identifier that is associated with an application 46 that is also stored in memory 42 on the mobile device 40. The memory 42 can also include instructions executable by the processor 44 to provide this information to an access control system when the application 46 is in use and the user has met certain conditions that enable the user to request that the digital identifier be sent to the access control system. In some cases, the user must authenticate himself to the mobile device by entering a password or fingerprint scan to unlock the mobile device 40 and/or the application 46, before the application 46 will initiate any sending of an identifier and/or unlock command.

Figure 2:
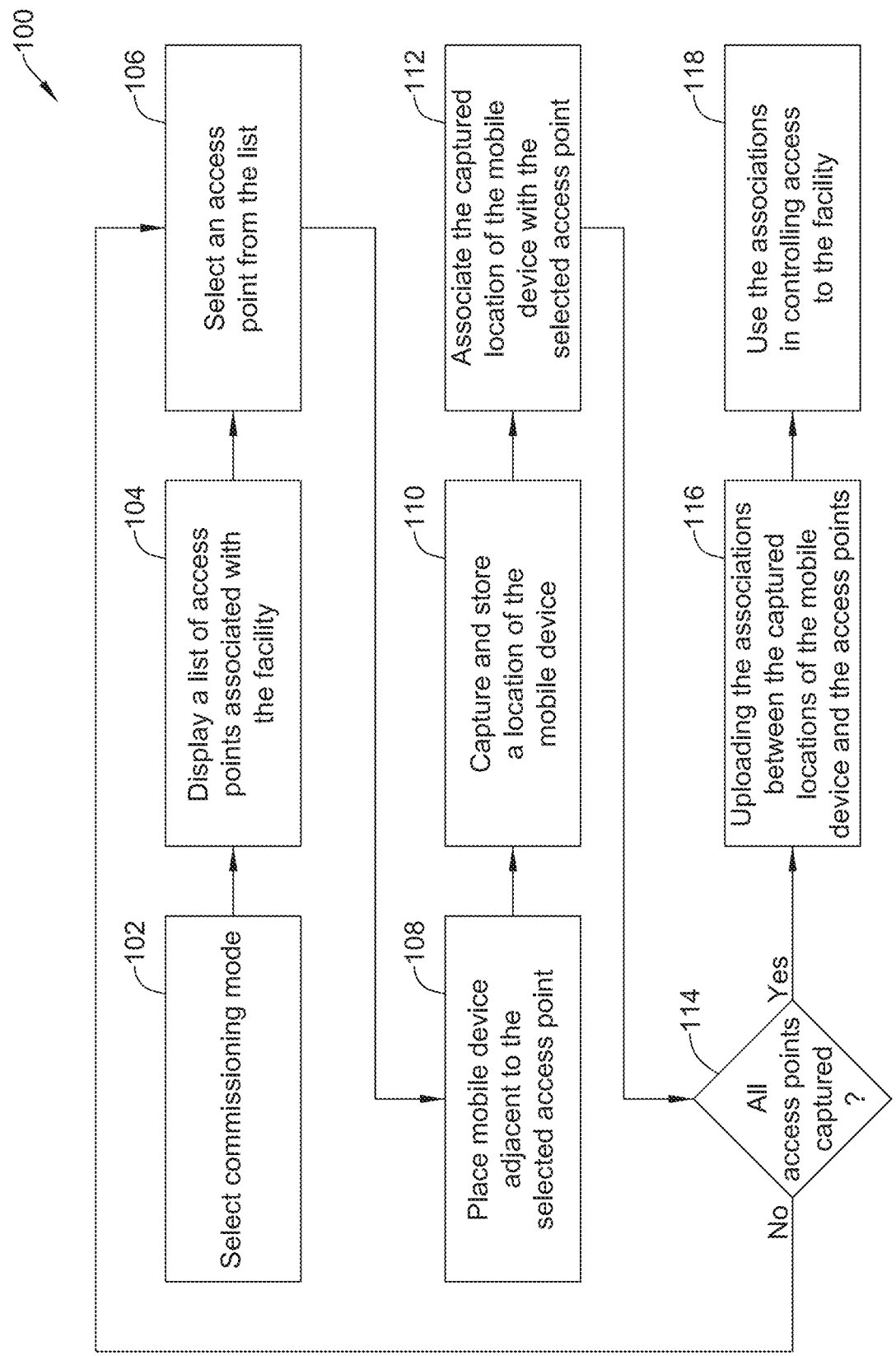
FIG. 2 is a flow chart of an illustrative method for commissioning an access control system.
Figure 3:
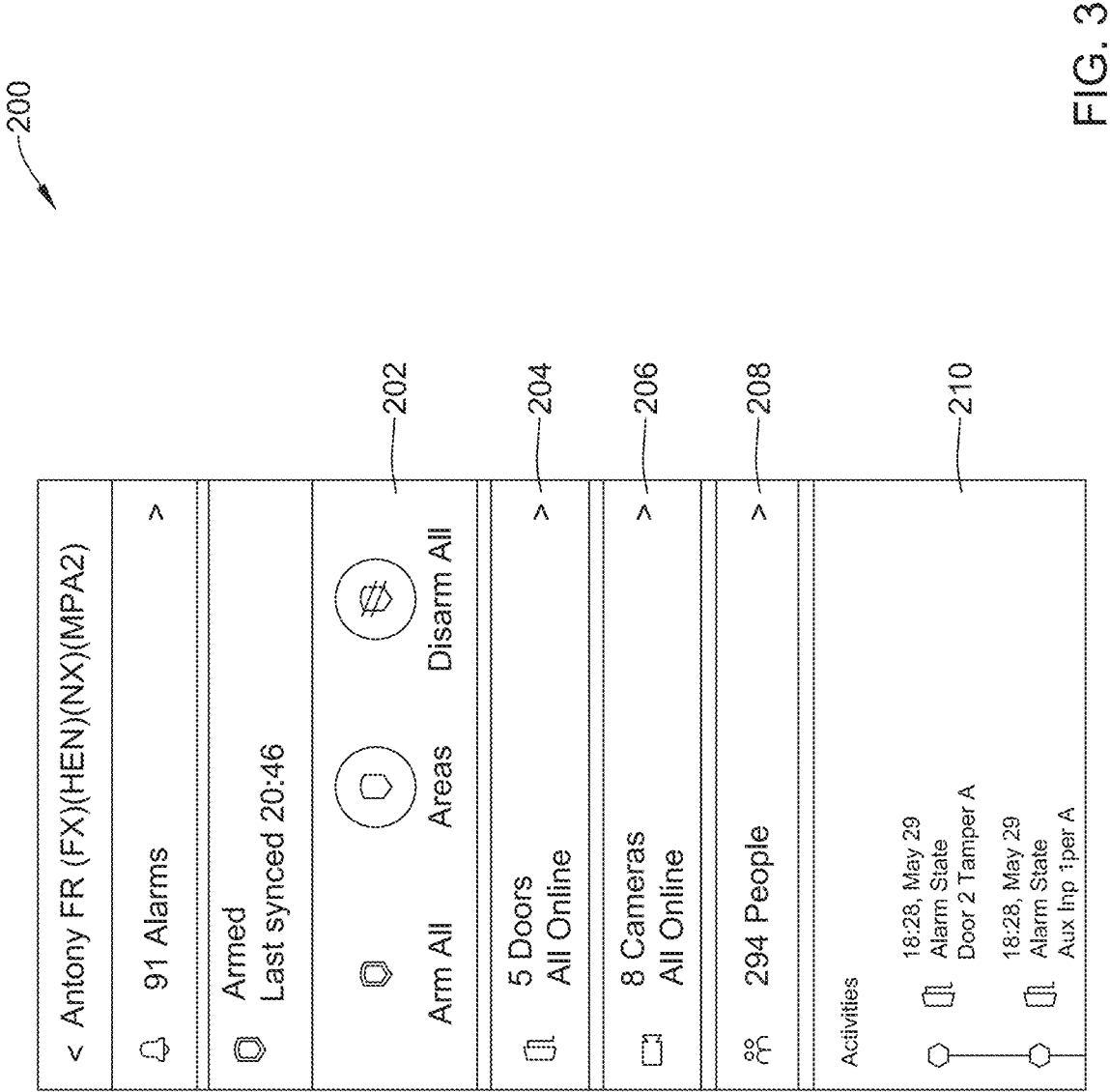
FIGS. 3-5 are illustrative screen captures of an application for commissioning the access control system for use by an installer.

FIG. 2 is a flow chart of an illustrative method 100 for commissioning an access control system (such as, but not limited to ACS 50 and/or ACS 60) for use with a mobile device 40 and application 46. While one or more access control systems 50, 60 may be commissioned with a same app or by a same person, for the sake of brevity, description of the commissioning procedure will be described with respect to a single access control system 50. In some cases, the method 100 for commissioning an access control system may be performed by an installer or other designated personnel. However, this is not required. To begin, the user may select a commissioning mode in an application (e.g., app 46) running on a mobile device 40, where the mobile device includes both a user interface and a location service. Prior to entering or once in the commissioning mode, the application may be configured to display available systems of a facility (e.g., access control systems, security systems, etc.) to the user. In some cases, the commissioning mode may be entered after selection of a particular system. FIG. 3 is an illustrative screen capture 200 of a summary screen that may be displayed on the mobile device 40 by the application 46 for a particular building (e.g., facility 20) when a supervising user or installer has entered their user credentials (e.g., username and password, facial recognition, fingerprint recognition, etc.). The application 46 may be configured to display a status of a security system 202, a number of access points 204 connected to the access control system 50, cameras or other devices associated with a security system 206, a number of people in the facility 208, and/or a summary of activities 210. These are just examples. Some information may be omitted or additional information included, as desired. In some cases, the summary screen 200 may be based on user defined settings or preferences.

Figure 4:
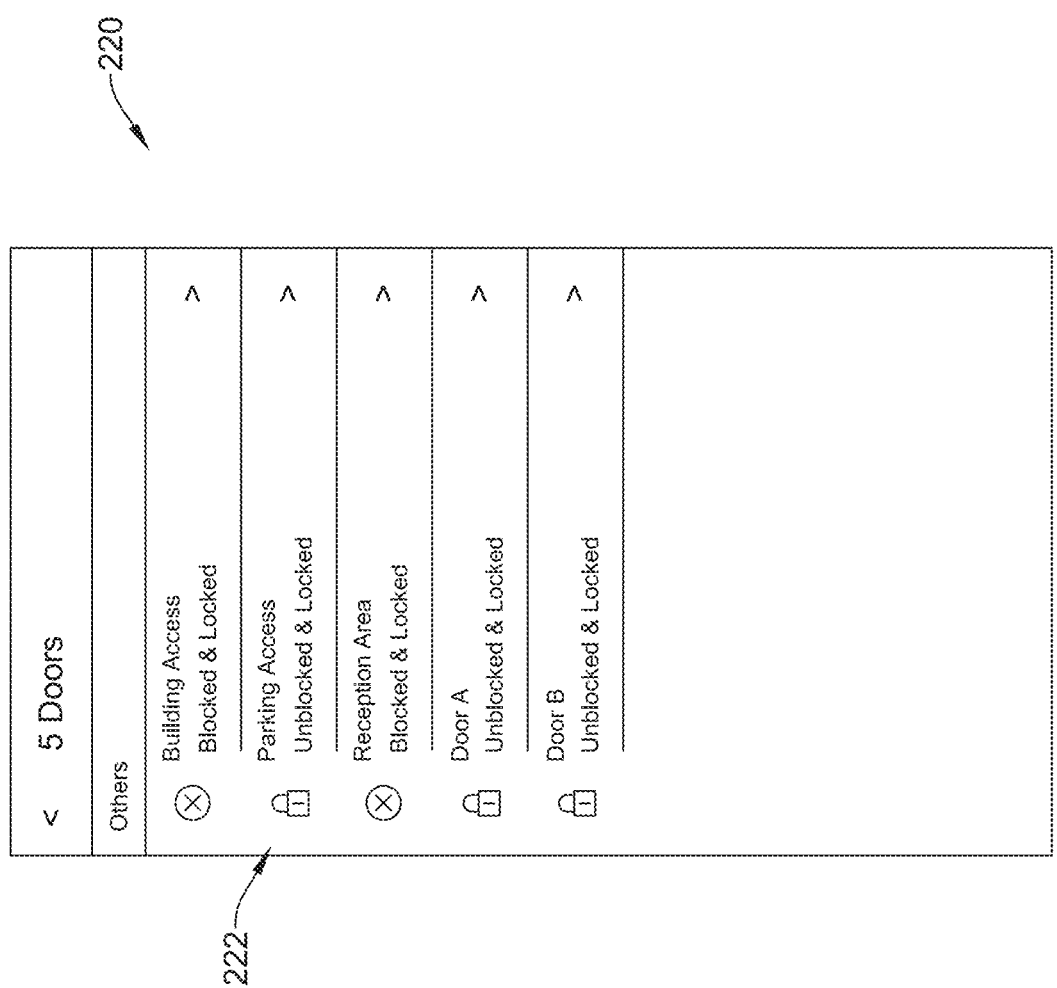
Figure 5:
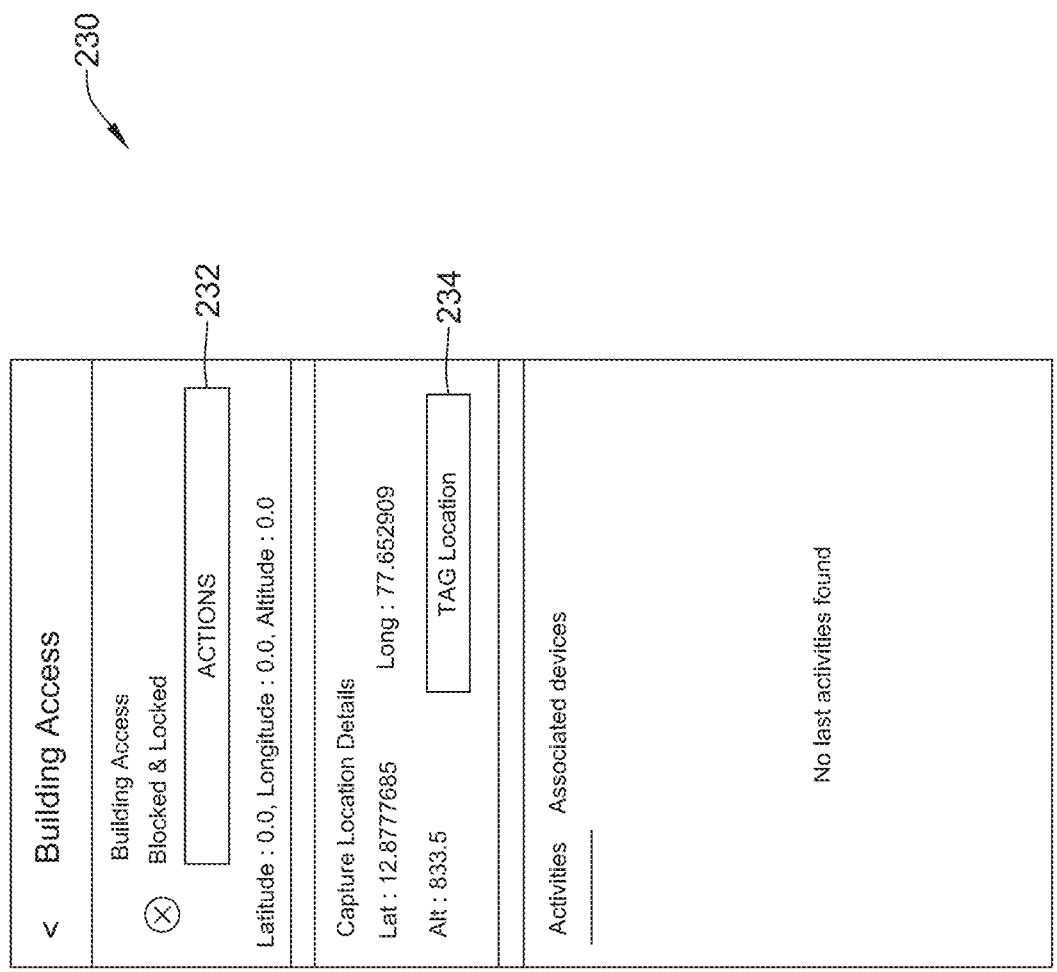

Returning to FIG. 2, in the commissioning mode, a list of access points associated with the facility may be displayed on the user interface of the mobile device 40, as shown at block 104. FIG. 4 is an illustrative screen capture 220 of a list of access points 222 associated with the facility 30. This screen 220 may be reached by selecting the access points 204 on screen 200 of FIG. 3. Returning to FIG. 2, a selection of an access point from the list of access points may be received via the user interface of the mobile device 40, as shown at block 106. The access points are not required to have a card reader to be displayed. For example, any access point capable of having a remotely actuated locking mechanism may be displayed. FIG. 5 is an illustrative screen capture 230 of details for a selected access point. In the illustrative embodiment, the "building access" access point was selected from the list illustrated in screen capture 220 of FIG. 4. In the illustrative embodiment, the user has the option to select an "actions" button 232 or to select a "TAG location" button 234. Returning to FIG. 2, the mobile device 40 may be carried and physically placed adjacent to the selected access point, as shown at block 108. In some cases, the user may need to travel to the selected access point in order to place the mobile device 40 adjacent thereto. It is contemplated that the list of access points 222 may be dynamically updated as the installer moves through the facility 20 to display only access points in close proximity to the installer, although this is not required. In some cases, the list of access points 222 may display all access points in the facility 20.

Once the mobile device 40 is adjacent to the selected access point, the current location of the mobile device 40 and thus a location of the selected access point may be captured and stored, as shown at block 110. In some cases, this may be performed through selection of the TAG location button 234 on the user interface of the mobile device 40. The location of the mobile device 40 may be determined using a GPS location of the mobile device 40 using location services of the mobile device 40. The GPS location may include latitude, longitude, and altitude as shown in FIG. 5. The captured location of the mobile device 40 may be associated with the selected access point, as shown at block 112 of FIG. 2. In some cases, the captured location may be stored with the selected access point in a database in the cloud server 70. In other cases, the captured location may be stored locally within the facility 20 and/or at any other suitable location.

Next, it may be determined if a location has been captured and stored for each access point of the facility 20 desired to be accessible via a mobile device, as shown at block 114 of FIG. 2. If not all of the access points have been captured, the steps of receiving a selection of an access point 106, placing the mobile device 40 adjacent to the selected access point 108, capturing and storing a location 110 of the mobile device 40, and associating the captured location of the mobile device 40 with the selected access point 112 may be repeated for each access point desired to be accessible via a mobile device 40. In some cases, the receiving 106, placing 108, capturing 110, and associating 112 steps may be repeated for each of two or more access points in the list of access points shown in FIG. 4.

The associations between the captured locations of the mobile device 40 and each of the access points may then be uploaded, as shown at block 116. In some cases, the captured locations of the mobile device and each of the access points may be uploaded to a remote cloud server 70. In other cases, the captured locations of the mobile device and each of the access points may be uploaded to a server or storage device located locally to the facility. Once the associations have been stored, they may be used to control access to and within the facility 20, as shown at block 118.

Figure 6:
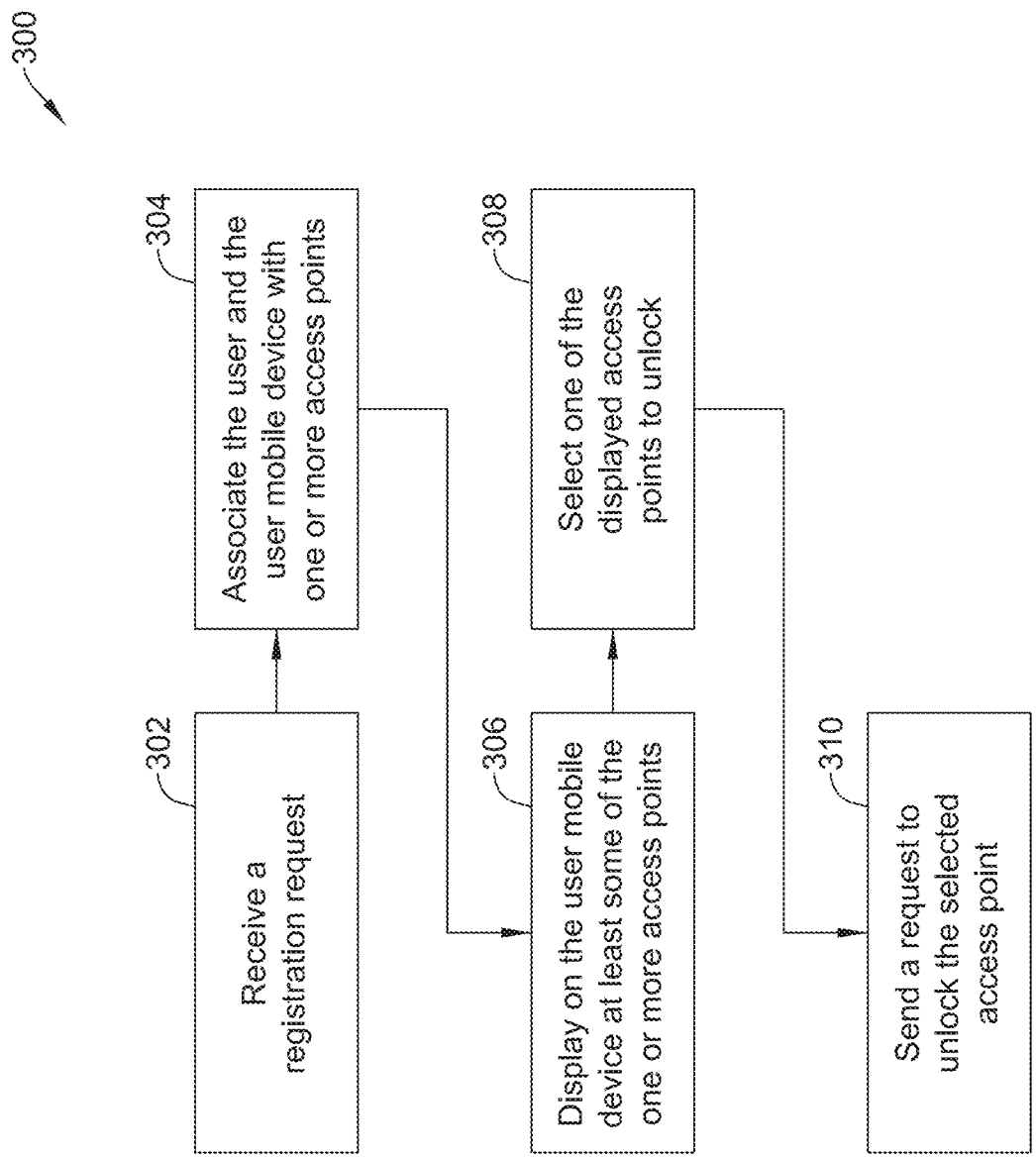
FIG. 6 is a flow chart of an illustrative method for using a user's mobile device to access a building.

In some cases, a subsequent user may be required to register with an access control system 50 to use a mobile device 40 to access a facility 20 or an area 24 within the facility 20. FIG. 6 is an illustrative flow chart 300 of a method for registering a user to the ACS 60 and accessing an access point. To begin, a registration request may be received from a user, as shown at block 302. In some cases, the user may initiate the user registration request via the app 46 used to access one or more access points in the facility 20. In other cases, the user may initiate the user registration request via a web browser, email or any other suitable mechanism. In some cases, a supervising user may initiate the registration request on behalf of the user. Once the user request is received, the user and the user's mobile device 40 may be associated with one or more access points, as shown at block 304. It is contemplated that a quantity of access points or which particular access points may be associated with a user may be determined, at least in part, on an employment status and/or a hierarchical level of the user. For example, a regular employee may have the ability to access more access points than a contract employee who in turn may have the ability to access more access points than a visitor. This is just one example.

Figure 7:
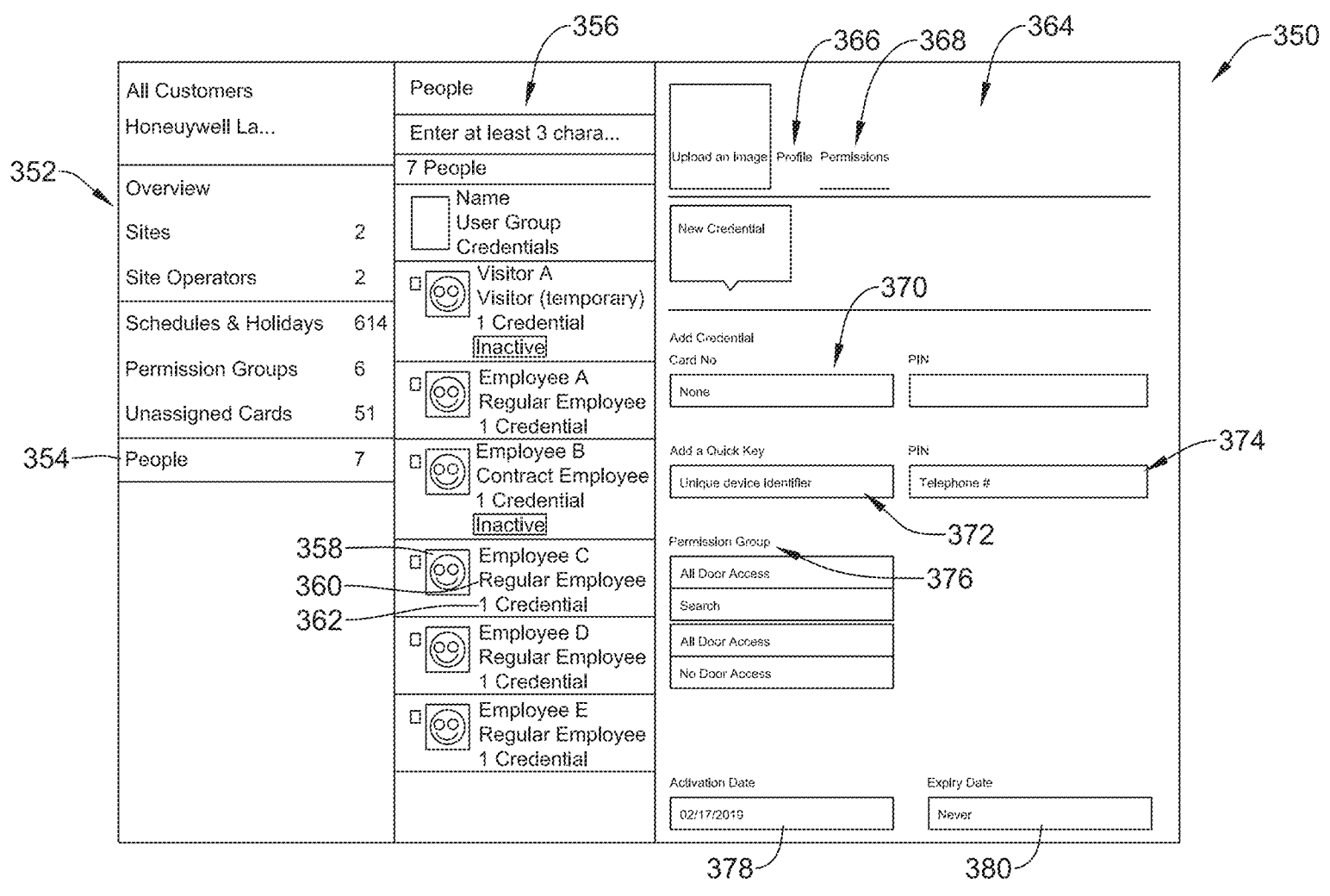

In some cases, the registration process may be performed by a supervising or administrative user. For example, an administrative user may utilize a mobile device access setup portal to associate a user and/or a user's mobile device with access permissions. FIG. 7 is a screenshot of an illustrative mobile device access setup portal 350 for use by an administrator. The setup portal 350 may include a list or menu 352 of selectable options. For example, the menu 352 may allow the supervising user to view detailed information related to building sites 20, 30 and/or access control systems 50, 60 thereof. In some cases, the menu 352 may include an option to allow the supervising user to view and/or edit "people"

354 (among other options) associated with the organization. In the illustrative embodiment of FIG. 7, people 354 has been selected and detailed information regarding people associated with the organization is displayed. For example, the setup portal 350 includes a list of people 356. The list may include an image 358 of each particular person and an employment status 360 (e.g., visitor, regular employee, contract employee, temporary employee, etc.) This list 356 may also include access credentials 362 associated with the particular person. Selection of a particular person may allow the administrative user to edit the information and/or permissions associated with the particular person.

In the illustrative embodiment of FIG. 7, a new user is being added in region 364 of the screen. The administrative user may generate a profile for the new user through the selection of the profile tab 366 and may add permissions through the selection of the permissions tab 368. In the illustrative embodiment of FIG. 7, the permissions tab 368 has been selected. The supervising user may add a card-based access credential 370 that is assigned to the new user, although this is not required. The supervising user may also add information that associates a specific mobile device 40 with the new user, such as, but not limited to a unique device identifier 372 and/or a mobile device telephone number 374 of the user's mobile device. In some cases, the unique device identifier 372 may be automatically detected via the application 46 and transmitted with the user request. The supervising user may also assign the user to a permissions group 376 which determines which access points or group of access points the user is authorized to access with the mobile device 40 (and/or access card). For example, the user and the user mobile device 40 may be associated with one or more access points from the list of access points 376 based on one or more user permissions. In some cases, the user may not be granted door access. In other cases, the user may be assigned a custom permissions group. The administrative user may also select an activation date 378 and/or an expiration date 380 to further customize a user's access permissions. It is further contemplated that the supervising user may assign time windows during which the user may utilize the access points. For example, the user may be allowed to use access points during predetermined hours and/or predetermined days.

In some cases, a visitor to the facility 20 may be capable of submitting an access request for preapproval. It is contemplated that when the visitor request is approved and credentials assigned, the visitor may receive an email or a text message with a link to download the app 46 as well as login credential information. In other cases, the visitor may register or submit a visit request using the application 46. This may facilitate visitor access during high volume hours.

Returning to FIG. 6, once a user and the user mobile device have been associated with one or more access points, the user may begin to use the mobile device 40 to open one or more access points. Generally, the user may open the application 46 on the mobile device 40 to display on the user mobile device 40 at least some of the access points available to the user, as shown at block 306. It is contemplated that not all of the access points available to the user (based on the user permissions) will be displayed simultaneously. For example, the current location of the user mobile device 40 may be used select a subset of the available access points to be displayed. A distance between the current location of the user mobile device 40 (as determined by the location services of the user mobile device 40) and the locations of the access points captured in the commissioning mode (and associated with access points) may be determined. Access points that are within a threshold distance of the current location of the user mobile device 40 may be displayed on the user interface of the user mobile device 40. It is contemplated that the threshold distance is programmable. This may facilitate the locating of the access point that is desired to be opened by reducing the number of access points visible to the user. The user may then select one of the displayed access points unlock, as shown at block 308. The request to unlock the access point may be sent to the ACS 60, in some cases, via an intermediate cloud server 70, as shown at block 310. In some cases, the user may receive a confirmation on the user mobile device 40 that the access point has been unlocked.

Figure 8:
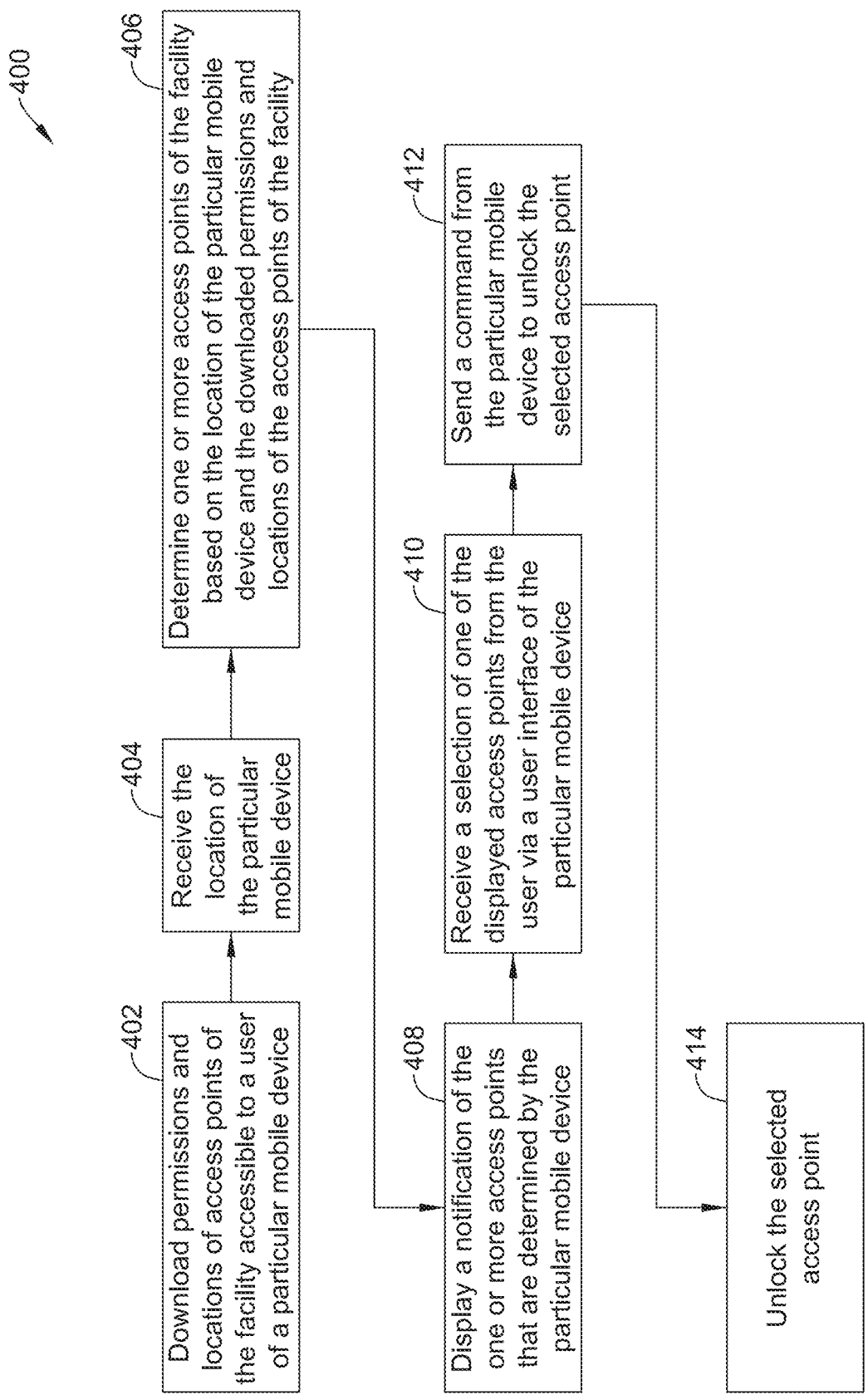
FIG. 8 is a flow chart of another illustrative method for using a user's mobile device to access a building.

FIG. 8 is a flow chart of another illustrative method 400 of using a user's mobile device 40 to access a building. It should be understood that actions performed at the mobile device 40 is accomplished by the processor 44 executing executable instructions stored in a memory 42 of the mobile device 40 and/or logic of the mobile device 40. To begin, permissions and locations of access points of the facility that are accessible to the user of a particular mobile device 40 are downloaded to the particular mobile device 40, as shown at block 402. It is contemplated that this step may not be needed each time the user accesses the application 46. A user may present user credentials to the application 46 via a user interface of the mobile device 40 in order to authenticate themselves to the application 46 to verify the users identify. This may include providing a username and password and/or using biometric identification such as, but not limited to fingerprint recognition and/or facial recognition. In some cases, the user credentials may be verified by comparing the provided credentials to credentials saved at the mobile device 40 or at the cloud server 70, as desired. Once the user is authenticated, the permissions and locations of access points in the facility that are accessible to the user (for example, as defined in the setup portal) may be downloaded (e.g., from the cloud server 70 or local facility storage) to the user mobile device 40 and saved in the memory 42 thereof. This may allow quicker response times during use of the application 46 but may not be required. For example, the application 46 may access permissions and locations stored remotely, for example, at the cloud server 70. The access permissions and locations may include, but are not limited to, which access points are available to the user, GPS locations of those access points, employment status of the user, access time windows, etc.

The location of the particular mobile device 40 may be received or determined, as shown at block 404. For example, the application 46 may receive the GPS location of the mobile device from the location services of the mobile device 40. In some cases, the mobile device 40 may be configured to recognize a measure of error in the current location of the mobile device 40. In some cases, the particular mobile device 40 may then determine one or more access points of the facility to display to the user based on the location of the particular mobile device, the downloaded permissions, and locations of the access points of the facility, as shown at block 406. For example, the particular mobile device 40 may determine which access points are accessible to the user (based on assigned permissions) and/or within a predetermined threshold distance of the user. It is contemplated that the threshold distance may take into consideration the measure of error that may occur when locating the position of the mobile device 40. For example, the threshold distance may be based at least in part on the identified measure of error in the current location of the mobile device. In some cases, the mobile device 40 may be configured to determine a distance between the current location of the mobile device 40 and each of one or more access points of a facility. A notification of the one or more access points that are determined by the particular mobile device may be displayed on the particular mobile device, as shown at block 408.

In some cases, the notification may identify those access points that are within a predetermined distance from the particular mobile device 40 and does not include those access points that are not within the predetermined distance from the particular mobile device 40. In some embodiments, the notification identifies or includes all access points in the facility that are accessible by the user. In some cases, the access points that are displayed on the user interface of the user device 40 may be those that are accessible to the user based on one or more access point permissions associated with the user and are within a threshold distance from the current location of the mobile device 40. It is contemplated that the displayed access points may be continually or repeatedly updated based on the current location of the mobile device 40. For example, as the mobile device 40 moves away from a particular access point, the particular access point may be removed from the notification, and additional access points may be added as the mobile device 40 comes within the threshold distance.

Figure 9:
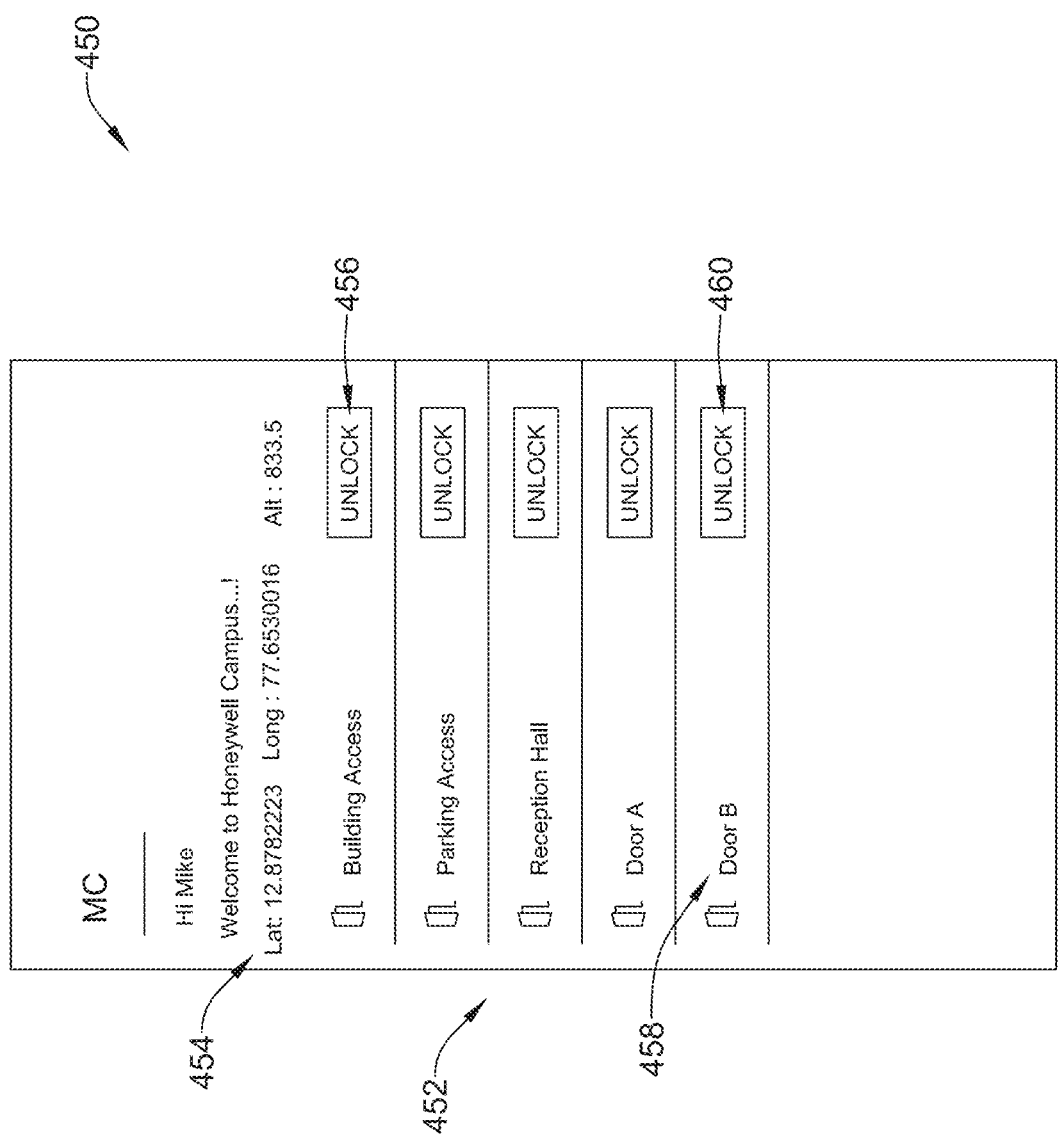

FIG. 9 is a screen capture 450 of a notification or list of available access points 452 that may be displayed to the user on the particular mobile device. The list of available access points 452 may vary from user to user based on user location and/or user permissions. In some cases, the particular mobile device 40 may also display the current GPS location 454 of the mobile device 40 as shown. It is contemplated that each access point of the list of available access points 452 may include a selectable button 456 configured to transmit an unlock or lock request, as will be described in more detail herein. It is contemplated that the list of available access points 452 may be based, at least in part, on the assigned permissions including, but not limited to, a current time falling within the one or more access time windows assigned to the user or an employment status of the user. In some embodiments, some access points may be displayed which are not available to the user. In such an instance, the selectable button 460 may be omitted or grayed out and unselectable.

Figure 10:
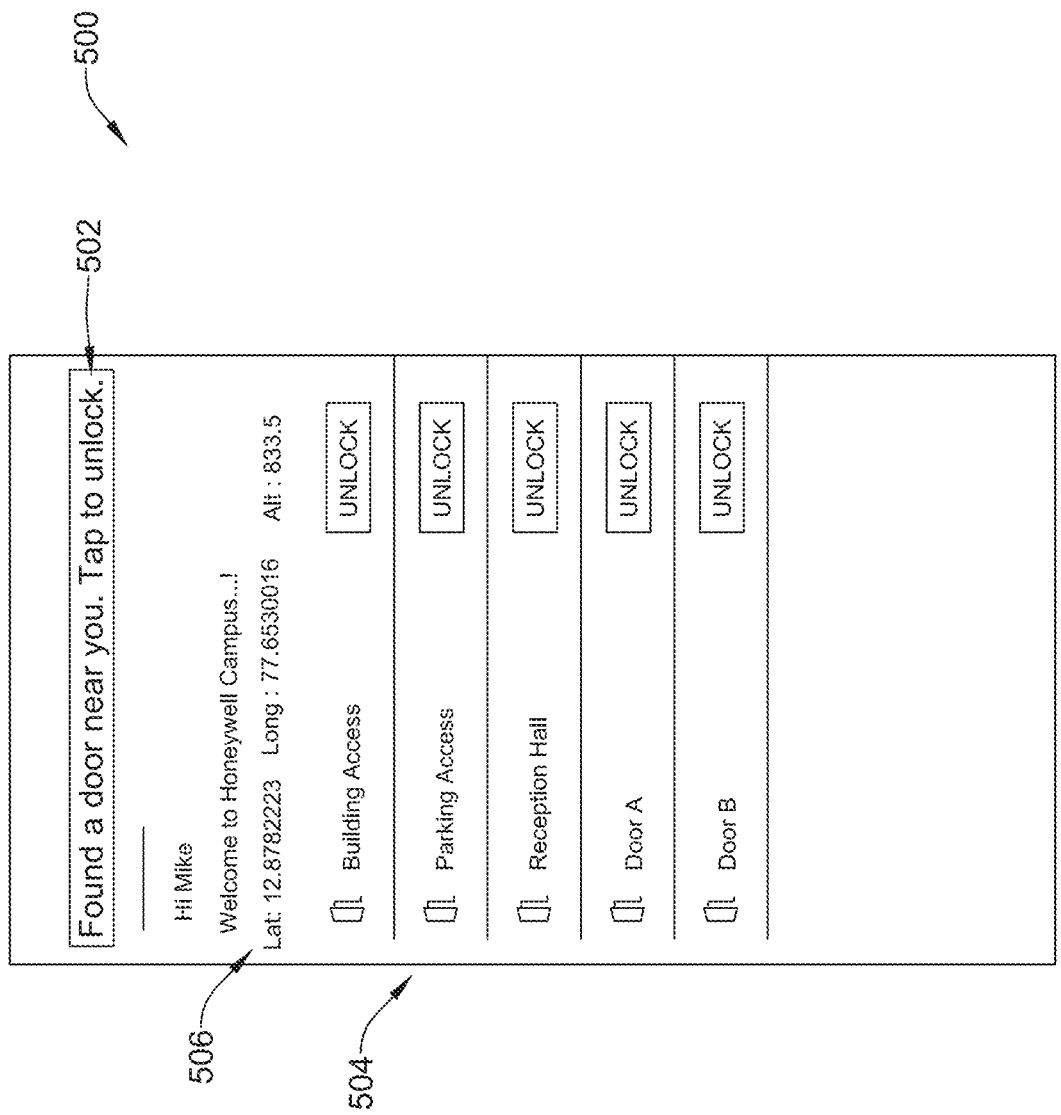

In some cases, the notification may be a pop-up alert that access points have been identified. The identified access points may be those that are accessible to the user and within a threshold distance of the mobile device 40. FIG. 10 is a screen capture 500 of a mobile device 40 including pop-up alert 502. In the illustrative example, the user interface of the mobile device 40 also displays a list 504 of access points available to the user and the GPS location 506 of the user mobile device. However, this is not required.

It is contemplated that the notification or list of available access points 452 may be automatically displayed as the user approaches an access point, without user input. In some cases, the available access points 452 that are displayed may be ranked, with the closest access point placed at the top of the list (if more than one access points are listed). When so provided, the user need not have to click through various menus of the application to identify a button to open a particular door. Instead, the application may automatically present an appropriate button to the user to unlock a door as the user approaches the door.

Figure 11:
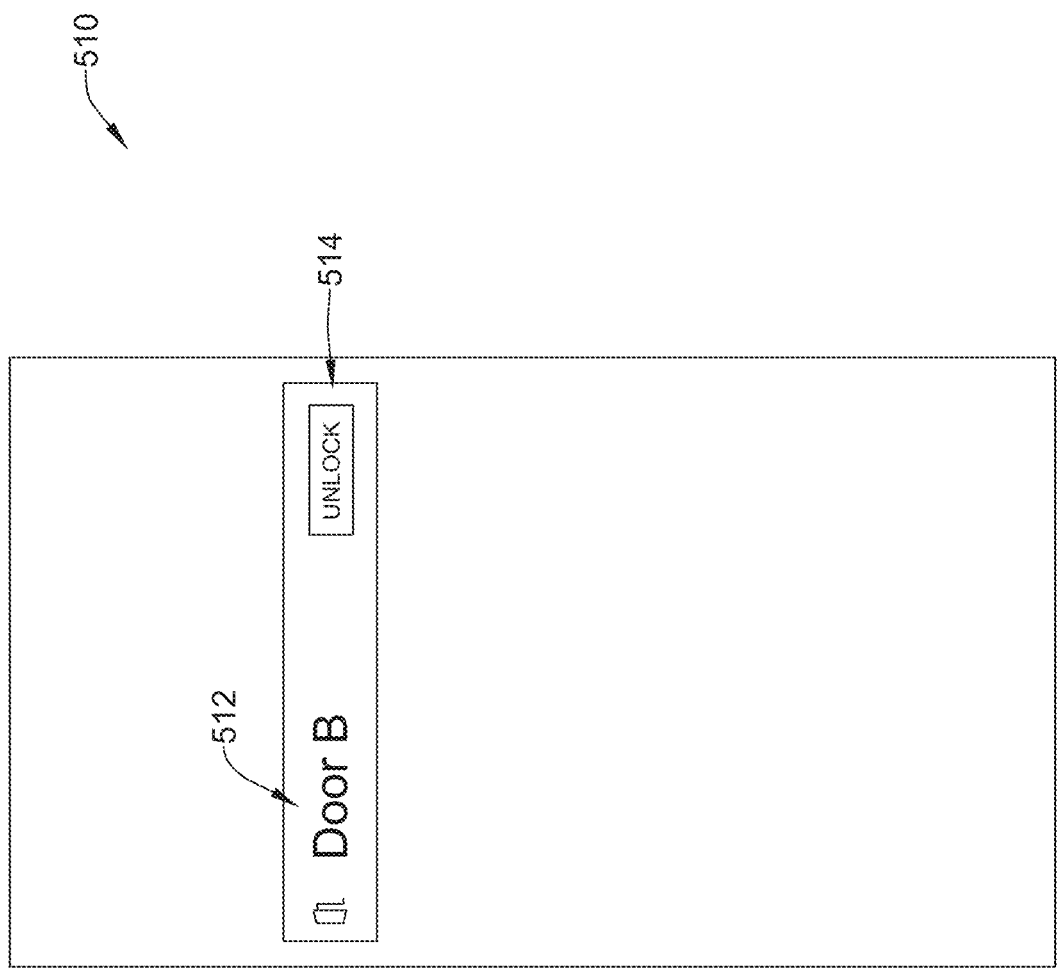

Returning back to FIG. 8, a selection of one of the displayed access points from the user via a user interface of the particular mobile device may be received, as shown at block 410. For example, the user may select the "unlock" button 460 adjacent to Door B 458 as shown in FIG. 9. Alternatively, the user may select the pop-up notification 502 illustrated in FIG. 10. This may cause the mobile device 40 to display that the door that has been found. FIG. 11 is an illustrative screen capture 510 of the mobile device 40 upon selection (e.g., tapping) of the pop-up notification 502. The mobile device 40 may be configured to display the "found" or nearby door 512 along with a selectable unlock button 514. The user may select the unlock button 514 associated with Door B in FIG. 11. In some cases, the unlock buttons 460, 514 may not be selectable until the mobile device 40 is within a threshold distance of the access point to prevent unauthorized users from gaining entry if an unlock button is selected before the user is ready to enter the access point.

Returning again to FIG. 8, upon selection of an access point to unlock (e.g., selection of unlock button 460 or unlock button 514), the mobile device may send a command to unlock the selected access point, as shown at block 412. The mobile device 40 may transmit the command to the cloud server 70, although this is not required. In some cases, the cloud server 70 may validate the permissions of the mobile device 40 making the unlock request. For example, the cloud server 70 may compare the mobile device identifier to a list of identifiers allowed to access the selected access point. This may also include verifying that the identifier can use the access point at the current time. In response to the command to unlock the selected access point, the selected access point may be unlocked, as shown at block 414. For example, after validation of the mobile device 40, the cloud server 70 may transmit a command to the ACS 50 to actuate the relay associated with the selected access point. It is contemplated that a user may use the mobile device 40 to lock an access point that is not automatically secured in a manner similar to the unlocking procedure. In some cases, the mobile device 40 may be configured to receive and display a notification or confirmation that the selected access point has been unlocked. FIG. 12 is an illustrative screen capture 520 of the mobile device 40 displaying a pop-up notification 522 indicating that the access point has been unlocked. It is contemplated that the ACS 50 may transmit a message to the cloud server 70 that the selected access point was unlocked. The cloud server 70 may relay this message to the mobile device 40 where it is received and displayed to the user via the user interface.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for unlocking a particular locked device that is associated with providing access to a facility, the method comprising:
   initiating an access request via an application program running on a mobile device requesting preapproval for permission to unlock the particular locked device during a requested future time window;
   receiving the access request;
   receiving a unique identifier associated with the mobile device, and associating the unique identifier with the access request, wherein the unique identifier includes one or more of a unique device identifier of the mobile device and a mobile telephone number of the mobile device;
   assigning permissions to the access request, wherein the permissions define access rights for the mobile device associated with the access request that allow the mobile device to unlock the particular locked device during the requested future time window;
   sending the permissions to the mobile device associated with the access request for use by the application program running on the mobile device;
   the application program running on the mobile device associated with the access request causing the mobile device to wirelessly send an unlock command to the particular locked device to unlock the particular locked device after:
      receiving, at a time that is within the requested future time window defined by the assigned permissions, an unlock request via a user interface of the mobile device to unlock the particular locked device;
      determining that the mobile device is within a wireless range of the particular locked device; and
   the particular locked device, upon wirelessly receiving the unlock command, unlocking the particular locked device.

2. The method of claim 1, wherein the wireless range is a Bluetooth wireless range.

3. The method of claim 1, wherein the unique device identifier includes an International mobile equipment identity (IMEI) number of the mobile device.

4. The method of claim 1, wherein the requested future time window is defined at least in part by an activation date.

5. The method of claim 1, wherein the requested future time window is defined at least in part by an expiration date.

6. The method of claim 1, wherein the requested future time window corresponds to one or more predetermined hours and/or one or more predetermined days.

7. The method of claim 1, wherein the receiving the access request, receiving the unique identifier, associating the unique identifier with the access request, assigning permissions, and sending the permissions steps are performed by one or more servers remote from the mobile device.

8. The method of claim 1, wherein the particular locked device is one of a plurality of locked devices, and wherein the access request includes an identifier that uniquely identifies the particular locked device from the plurality of locked devices.

9. The method of claim 8, wherein the application program running on the mobile device is configured to:
   displaying two or more of the plurality of locked devices on the user interface of the mobile device;
   receiving one or more inputs that identify the requested future time window; and
   receiving an input via the user interface of the mobile device that initiates the access request requesting preapproval for permission to unlock the particular locked device during the requested future time window.

10. The method of claim 1, where receiving the unlock request comprises:
    displaying via the user interface of the mobile device an unlock button that is associated with the particular locked device; and
    receiving via the user interface of the mobile device a selection of the unlock button that is associated with the particular locked device.

11. A system for unlocking a particular locked device that is associated with providing access to a facility, comprising:
    a mobile device including:
       a user interface;

a unique identifier;
a wireless interface;
a controller configured to:
receive an access request via the user interface of the mobile device, wherein the access request requests preapproval for permission to unlock the particular locked device during a requested future time window;
send the access request to a server;
send the unique identifier to the server;
the server configured to:
receive the access request from the mobile device;
receive the unique identifier from the mobile device;
associate the unique identifier with the access request;
assign permissions to the access request, wherein the permissions define access rights for the mobile device that allow the mobile device with the unique identifier to unlock the particular locked device during the requested future time window;
send the permissions to the mobile device;
the controller of the mobile device is further configured to:
receive the permissions from the server;
receive an unlock request via the user interface of the mobile device to unlock the particular locked device;
determine whether the mobile device is within a wireless range of the particular locked device; and
send an unlock command via the wireless interface to the particular locked device to unlock the particular locked device when the unlock request is received at a time that is within the requested future time window defined by the assigned permissions and when the mobile device is within the wireless range of the particular locked device.

12. The system of claim 11, wherein the wireless interface of the mobile device includes a Bluetooth communication interface, and the wireless range is a Bluetooth wireless range.

13. The system of claim 11, wherein the wireless interface of the mobile device includes a cellular communication interface, wherein the controller of the mobile device is configured to send the access request and the unique identifier to the server via the cellular communication interface.

14. The system of claim 11, wherein the wireless interface of the mobile device includes a WiFi communication interface, wherein the controller of the mobile device is configured to send the access request and the unique identifier to the server via the WiFi communication interface.

15. The system of claim 11, wherein the controller of the mobile device is configured to:
display two or more of a plurality of locked devices on the user interface of the mobile device;
receive via the user interface of the mobile device one or more inputs that identify the requested future time window; and
receive an input via the user interface of the mobile device that initiates the access request requesting preapproval for permission to unlock the particular locked device during the requested future time window.

16. The system of claim 11, where receiving the unlock request via the user interface of the mobile device comprises:
display via the user interface of the mobile device an unlock button that is associated with the particular locked device; and
receive via the user interface of the mobile device a selection of the unlock button that is associated with the particular locked device.

17. A method for unlocking a particular locked device that is associated with providing access to a facility, the method comprising:
initiating an access request requesting permission to unlock the particular locked device;
receiving the access request;
receiving a unique identifier associated with a mobile device, and associating the unique identifier of the mobile device with the access request;
assigning permissions to the access request, wherein the permissions define access rights for the mobile device to unlock the particular locked device;
sending the permissions to the mobile device;
the mobile device wirelessly sending an unlock command to the particular locked device to unlock the particular locked device after:
receiving an unlock request via a user interface of the mobile device to unlock the particular locked device;
determining that the mobile device is within a wireless range of the particular locked device; and
the particular locked device, upon wirelessly receiving the unlock command, unlocking the particular locked device.

18. The method of claim 17, wherein the access request requests preapproval for permission to unlock the particular locked device during a requested future time window, and the mobile device wirelessly sending an unlock command to the particular locked device to unlock the particular locked device after:
receiving, at a time that is within the requested future time window defined by the assigned permissions, an unlock request via a user interface of the mobile device to unlock the particular locked device; and
determining that the mobile device is within a wireless range of the particular locked device.

19. The method of claim 18, wherein requested future time window is defined at least in part by an activation date and/or an expiration date.

20. The method of claim 18, wherein the requested future time window corresponds to one or more predetermined hours and/or one or more predetermined days.

21. A method for unlocking a particular locked device that is associated with providing access to a facility, the method comprising:
granting by a first user to a second user, access rights to unlock the particular locked device during a specified future time window;
sending a link to a mobile device of the second user;
using the link to download an application program to the second user's mobile device;
running the application program on the second user's mobile device, the application program associated with the access rights granted to the second user, causing the second user's mobile device to wirelessly send an unlock command to the particular locked device to unlock the particular locked device after:
receiving, at a time that is within the specified future time window defined by the access rights, an unlock request via a user interface of the second user's mobile device to unlock the particular locked device; and
the particular locked device, upon wirelessly receiving the unlock command from the second user's mobile device when the second user's mobile device is within a wireless range of the particular locked device, unlocking the particular locked device.

22. The method of claim 21, wherein the second user is a visitor to the facility, and the access rights grant the second user temporary access to the facility.

23. The method of claim 21, wherein the application program running on the second user's mobile device causing the second user's mobile device to wirelessly send an unlock command to the particular locked device to unlock the particular locked device after:
   receiving, at a time that is within the specified future time window defined by the access rights, an unlock request via the user interface of the second user's mobile device to unlock the particular locked device; and
   determining that the second user's mobile device is within a wireless range of the particular locked device.

24. The method of claim 21, wherein receiving the unlock request via the user interface of the second user's mobile device comprises the second user selecting an unlock button displayed on a display of the user interface of the second user's mobile device.

25. The method of claim 24, wherein the unlock button is not selectable via the user interface of the second user's mobile device until the second user's mobile device is within a threshold distance of the particularly locked device.

26. The method of claim 21, wherein the specified future time window comprises a predetermined time window during a predetermined day.

27. The method of claim 21, wherein sending the link to the second user's mobile device comprises sending an email and/or a text message to the second user's mobile device, wherein the email and/or test message includes the link.

28. The method of claim 21, comprising the second user using the application program on the second user's mobile device to provide registration information to gain access to the access rights granted by the first user to unlock the particular locked device during the specified future time window.

29. The method of claim 21, wherein granting by the first user to the second user the access rights comprising:
   displaying a plurality of locked devices on a display;
   the first user selecting the particular locked device from the plurality of locked devices;
   the first user specifying the specified future time window;
   the first user identifying the second user; and
   granting the identified second user the access rights to unlock the selected particular locked device during the specified future time window.

30. The method of claim 29, comprising associating the second user's mobile device with:
   the second user; and
   the access rights granted by the first user to the second user.

* * * * *